United States Patent
Ge et al.

(10) Patent No.: US 10,618,301 B2
(45) Date of Patent: Apr. 14, 2020

(54) SEMICONDUCTOR DEVICE INCLUDING CAPACITIVE SENSOR AND ION-SENSITIVE TRANSISTOR FOR DETERMINING LEVEL AND ION-CONCENTRATION OF FLUID

(71) Applicant: HEWLETT-PACKARD DEVELOPMENT COMPANY, L.P., Houston, TX (US)

(72) Inventors: Ning Ge, Palo Alto, CA (US); Leong Yap Chia, Singapore (SG); Wai Mun Wong, Singapore (SG); Ser Chia Koh, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/570,660

(22) PCT Filed: Jul. 24, 2015

(86) PCT No.: PCT/US2015/041860
§ 371 (c)(1),
(2) Date: Oct. 30, 2017

(87) PCT Pub. No.: WO2017/018973
PCT Pub. Date: Feb. 2, 2017

(65) Prior Publication Data
US 2018/0290457 A1   Oct. 11, 2018

(51) Int. Cl.
*G01N 27/403* (2006.01)
*B41J 2/175* (2006.01)
*B41J 2/14* (2006.01)

(52) U.S. Cl.
CPC ....... *B41J 2/17566* (2013.01); *B41J 2/14153* (2013.01); *B41J 2/14201* (2013.01); *B41J 2002/17579* (2013.01)

(58) Field of Classification Search
None
See application file for complete search history.

(56) References Cited

U.S. PATENT DOCUMENTS

| | | | |
|---|---|---|---|
| 6,431,670 | B1 | 8/2002 | Schantz et al. |
| 7,249,506 | B2 | 7/2007 | Scardovi |
| 7,922,274 | B2 | 5/2011 | Kubota et al. |
| 8,425,744 | B2 | 4/2013 | Sun et al. |

(Continued)

FOREIGN PATENT DOCUMENTS

| | | |
|---|---|---|
| EP | 1691177 | 8/2006 |
| WO | WO2003073088 | 9/2003 |

OTHER PUBLICATIONS

Sense Fluid Levels With Capacitance, Sep. 2, 1993.

*Primary Examiner* — Matthew E. Gordon
(74) *Attorney, Agent, or Firm* — HP Inc. Patent Department

(57) ABSTRACT

In an example implementation, a method of operating a fluid sensing device includes enabling a fluid level sensing circuit on a printhead to determine a fluid level by sharing an applied charge between a capacitive sensor and a reference capacitor to determine a capacitance value of the capacitive sensor. The method includes enabling a fluid property sensing circuit on the printhead to determine a fluid property by measuring a transistor voltage that indicates a concentration of ions gathered on the capacitive sensor.

5 Claims, 6 Drawing Sheets

(56) References Cited

U.S. PATENT DOCUMENTS

| | | | |
|---|---|---|---|
| 2002/0029971 A1* | 3/2002 | Kovacs | B01J 19/0046 204/600 |
| 2002/0117694 A1* | 8/2002 | Migliorato | G01N 27/4148 257/253 |
| 2005/0230271 A1 | 10/2005 | Levon et al. | |
| 2007/0076024 A1 | 4/2007 | Jeong et al. | |
| 2007/0138028 A1* | 6/2007 | Chodavarapu | G01N 27/4148 205/787.5 |
| 2010/0137143 A1* | 6/2010 | Rothberg | C12Q 1/6874 506/2 |
| 2011/0299337 A1* | 12/2011 | Parris | H01L 27/11526 365/185.18 |
| 2014/0126269 A1 | 5/2014 | Tran | |
| 2014/0204148 A1 | 7/2014 | Ge et al. | |
| 2014/0210881 A1 | 7/2014 | Van Brocklin et al. | |

* cited by examiner

US 10,618,301 B2

SEMICONDUCTOR DEVICE INCLUDING CAPACITIVE SENSOR AND ION-SENSITIVE TRANSISTOR FOR DETERMINING LEVEL AND ION-CONCENTRATION OF FLUID

BACKGROUND

Inkjet printers are used around the world to provide fast, high quality, and affordable printing in both small scale and large scale printing formats. Inkjet printheads typically comprise thermal inkjet (TIJ) or piezoelectric inkjet (PIJ) semiconductor devices that are digitally controlled to dispense small droplets of fluid quickly and accurately by creating pulses within ink-filled firing chambers. Within inkjet printing systems, sensing the levels and properties of ink in ink supply reservoirs is desirable for various reasons. Accurately sensing and reporting the correct level of ink in an ink cartridge, for example, enables printer users to prepare to replace finished ink cartridges, helps users to avoid wasting ink, and enables printing systems to trigger actions that help prevent low quality prints due to inadequate ink levels. Sensing different fluid properties can be useful, for example, to determine the health and age of ink, to differentiate between different types of ink, to determine whether the ink has been properly mixed, and so on.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
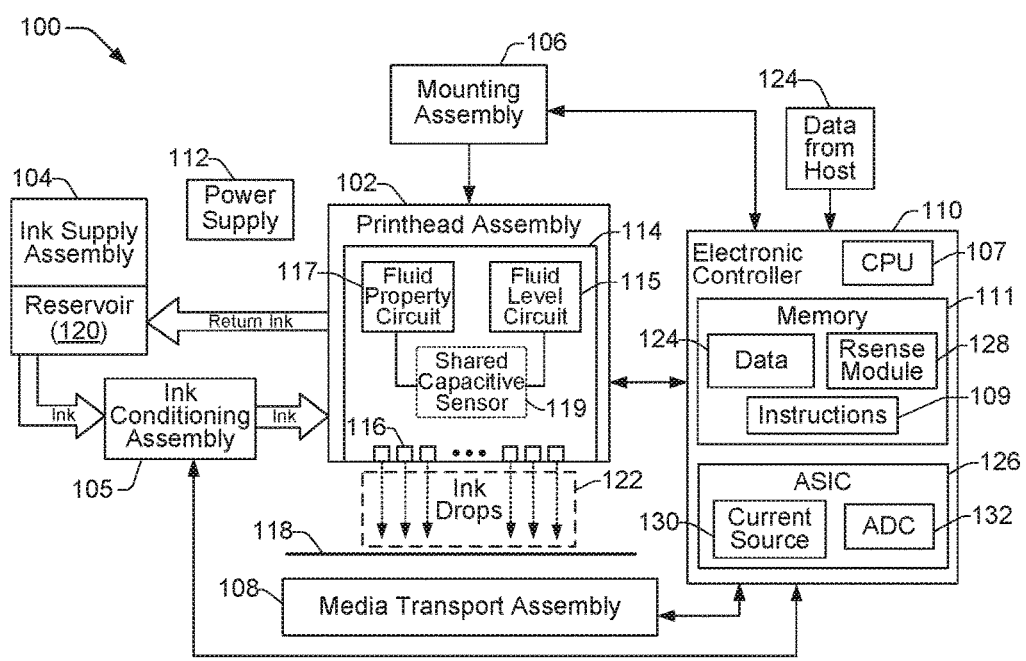
FIG. 1 shows an example of an inkjet printing system suitable for implementing devices for sensing both a property of a fluid and a level of a fluid.

As noted above, sensing the levels and properties of fluids in a system, such as ink in an inkjet printing system, is useful for a number of reasons. In general, such sensing creates value for both customers and manufacturers by reducing the cost of ink and improving the quality of printed output from inkjet printers. While additional sensing and reporting of fluid parameters is beneficial to both customers and manufacturers, the increased sensing comes at a cost. Currently, each sensing function involves the use of a different sensor. In addition, each sensing function usually involves the placement of a number sensors on a printhead die. As a result, with each additional sensing function added to a printhead, a considerable amount of space is consumed on the printhead die. This ultimately can reduce the number of printhead die available from each silicon wafer and result in an increased cost for each printhead.

Accordingly, example devices described herein provide for sensing both fluid properties and fluid levels using the same sensor component. That is, the sensor portion of two different sensor circuits performing two different sensing functions is shared between the two sensing functions. While the two sensing circuits are different, and the purpose of the two sensing circuits is different, a single sensor component can be used in common with both circuits. Both sensing circuits and the shared sensor component are integrated onto a printhead die. Because the sensor portion is the largest component within both of the sensing circuits, sharing the sensor component between the two circuits reduces the amount of space used on the printhead die by a significant amount. The sensing circuits can be alternately enabled by a shifting circuit so that one sensing function is performed at a time.

In one example, a device for sensing a property and level of a fluid includes a capacitive sensor that has a metal element, a switching layer positioned on the metal element, a metal sensing plate positioned on the switching layer, and a fluid in contact with the metal sensing plate. The device includes a first circuit to determine a capacitive value of the capacitive sensor by putting a charge on the capacitive sensor, where the capacitive value is to indicate a level of the fluid. The device includes a second circuit to determine a gate-to-source voltage of an ion-sensitive transistor, where the voltage is to indicate a concentration of ions within the fluid and thereby a property of the fluid.

In another example, a fluid sensing device, includes a capacitive sensor in contact with a fluid, a first sensing circuit to determine a level of the fluid based on a capacitive value of the capacitive sensor, a second sensing circuit to determine a property of the fluid based on a charge concentration of ions within the fluid, and a shifting circuit to switch the device between the first sensing circuit and the second sensing circuit.

In another example, a method of operating a fluid sensing device includes enabling a fluid level sensing circuit on a printhead, and determining a fluid level by sharing an applied charge between a capacitive sensor and a reference capacitor to determine a capacitance value of the capacitive sensor. The method also includes enabling a fluid property sensing circuit on the printhead, and determining a fluid property by measuring a transistor voltage that indicates a concentration of ions gathered on the capacitive sensor.

FIG. 1 illustrates an example of an inkjet printing system 100 suitable for implementing devices for sensing both a property of a fluid and a level of a fluid. The example inkjet printing system 100 includes an inkjet printhead assembly 102, an ink supply assembly 104, a mounting assembly 106, a media transport assembly 108, an electronic printer controller 110, and at least one power supply 112 that provides power to the various electrical components of inkjet printing system 100. In the FIG. 1 example, printhead assembly 102 includes a single printhead 114, while in other examples, printhead assembly 102 includes an array of printheads 114. Printhead 114 includes an on-chip fluid level sensor circuit 115 and fluid property sensor circuit 117. Common to both the fluid level sensor circuit 115 and fluid property sensor circuit 117 is a shared capacitive sensor 119. The shared capacitive sensor 119 is described in detail below with reference to FIGS. 4 and 5.

Figure 3:
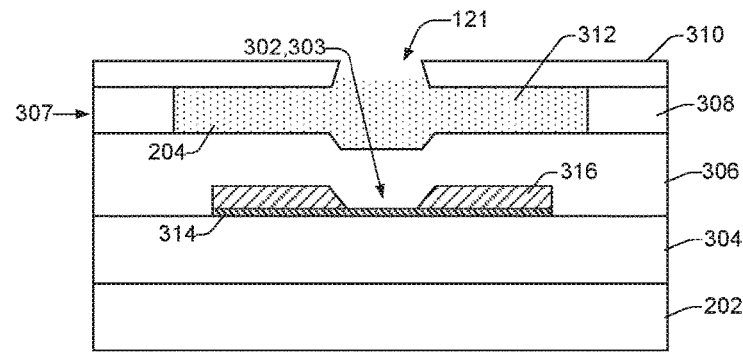
FIG. 3 shows a cross sectional view of an example of a nozzle portion of the printhead, including a drop generator.

Printhead 114 ejects drops of fluid ink through a plurality of orifices or nozzles 116 toward a print medium 118 so as to print onto print media 118. Print media 118 can be any type of suitable sheet or roll material, such as paper, card stock, transparencies, polyester, plywood, foam board, fabric, canvas, and the like. Each nozzle 116 includes a microelectromechanical system (MEMS) fluidics chamber, which, as shown in FIG. 3, includes several thin layers that define a fluid chamber 204, a drop generator 302 (an example of which is a thermal inkjet firing resistor), and a bore or drop exit 121. Nozzles 116 are typically arranged in one or more columns or arrays such that properly sequenced ejection of ink from nozzles 116 causes characters, symbols, and/or other graphics or images to be printed on print media 118 as inkjet printhead assembly 102 and print media 118 are moved relative to each other.

As shown in FIG. 1, ink supply assembly 104 supplies fluid ink to printhead assembly 102 and includes a reservoir 120 for storing ink. In different examples, the reservoir 120 of the ink supply assembly 104 may be removed, replaced, and/or refilled. Ink flows from reservoir 120 to inkjet printhead assembly 102. Ink supply assembly 104 and inkjet printhead assembly 102 can form either a one-way ink delivery system or a recirculating ink delivery system. In a one-way ink delivery system, substantially all of the ink supplied to inkjet printhead assembly 102 is consumed during printing. In a recirculating ink delivery system, however, only a portion of the ink supplied to printhead assembly 102 is consumed during printing. Ink not consumed during printing is returned to ink supply assembly 104.

In some examples, ink supply assembly 104 supplies ink under positive pressure through an ink conditioning assembly 105 to inkjet printhead assembly 102 via an interface connection, such as a supply tube. Ink supply assembly 104 includes, for example, a reservoir, pumps and pressure regulators. Conditioning in the ink conditioning assembly 105 may include filtering, pre-heating, pressure surge absorption, and degassing. Ink is drawn under negative pressure from the printhead assembly 102 to the ink supply assembly 104. The pressure difference between the inlet and outlet to the printhead assembly 102 is selected to achieve the correct backpressure at the nozzles 116. A suitable backpressure at the nozzles 116 may be a negative pressure ranging from between −1 inches of water and −10 inches of water.

As shown in FIG. 1, inkjet printing system 100 also includes mounting assembly 106. Mounting assembly 106 positions inkjet printhead assembly 102 relative to media transport assembly 108, and media transport assembly 108 positions print media 118 relative to inkjet printhead assembly 102. Thus, a print zone 122 is defined adjacent to nozzles 116 in an area between inkjet printhead assembly 102 and print media 118. In some examples, inkjet printhead assembly 102 is a scanning type printhead assembly. As such, mounting assembly 106 includes a carriage for moving inkjet printhead assembly 102 relative to media transport assembly 108 to scan print media 118. In other examples, inkjet printhead assembly 102 is a non-scanning type printhead assembly. As such, mounting assembly 106 fixes inkjet printhead assembly 102 at a prescribed position relative to media transport assembly 108. Thus, media transport assembly 108 positions print media 118 relative to inkjet printhead assembly 102.

Inkjet printing system 100 also includes electronic printer controller 110. Electronic printer controller 110 typically includes a processor (CPU) 107, firmware and/or software such as executable instructions 109, one or more memory components 111 including volatile and non-volatile memory components, and other printer electronics for communicating with and controlling inkjet printhead assembly 102, mounting assembly 106, and media transport assembly 108. The components of memory 111 comprise non-transitory, machine-readable (e.g., computer/processor-readable) media that provide for the storage of machine-readable coded program instructions, data structures, program instruction modules, JDF (job definition format), and other data for the printing system 100, such as instructions 109 and module 128. The program instructions, data structures, and modules stored in memory 111 may be part of an installation package that can be executed by a processor (CPU) 107 to implement various examples, such as examples discussed herein. Thus, memory 111 may be a portable medium such as a CD, DVD, or flash drive, or a memory maintained by a server from which the installation package can be downloaded and installed. In another example, the program instructions, data structures, and modules stored in memory 111 may be part of an application or applications already installed, in which case memory 111 may include integrated memory such as a hard drive.

Electronic controller 110 receives data 124 from a host system, such as a computer, and temporarily stores data 124 in a memory 111. Typically, data 124 is sent to inkjet printing system 100 along an electronic, infrared, optical, or other information transfer path. Data 124 represents, for example, a document and/or file to be printed. As such, data 124 forms a print job for inkjet printing system 100 and includes one or more print job commands and/or command parameters. The electronic printer controller 110 can control inkjet printhead assembly 102 for ejection of ink drops from nozzles 116. For example, the electronic controller 110 can define a pattern of ejected ink drops that form characters, symbols, and/or other graphics or images on print media 118. The pattern of ejected ink drops is determined by the print job commands and/or command parameters from data 124.

In some examples, the electronic controller 110 may include a printer application specific integrated circuit (ASIC) 126 and a resistance-sense firmware module 128 which includes computer readable instructions executable on ASIC 126 or controller 110. The printer ASIC 126 may include a current source 130 and an analog to digital converter (ADC) 132. ASIC 126 can convert the voltage present at current source 130 to determine a resistance, and then determine a corresponding digital resistance value through the ADC 132. Computer readable instructions implemented by the resistance-sense module 128 enable the resistance determination and the subsequent digital conversion through the ADC 132.

Figure 2:
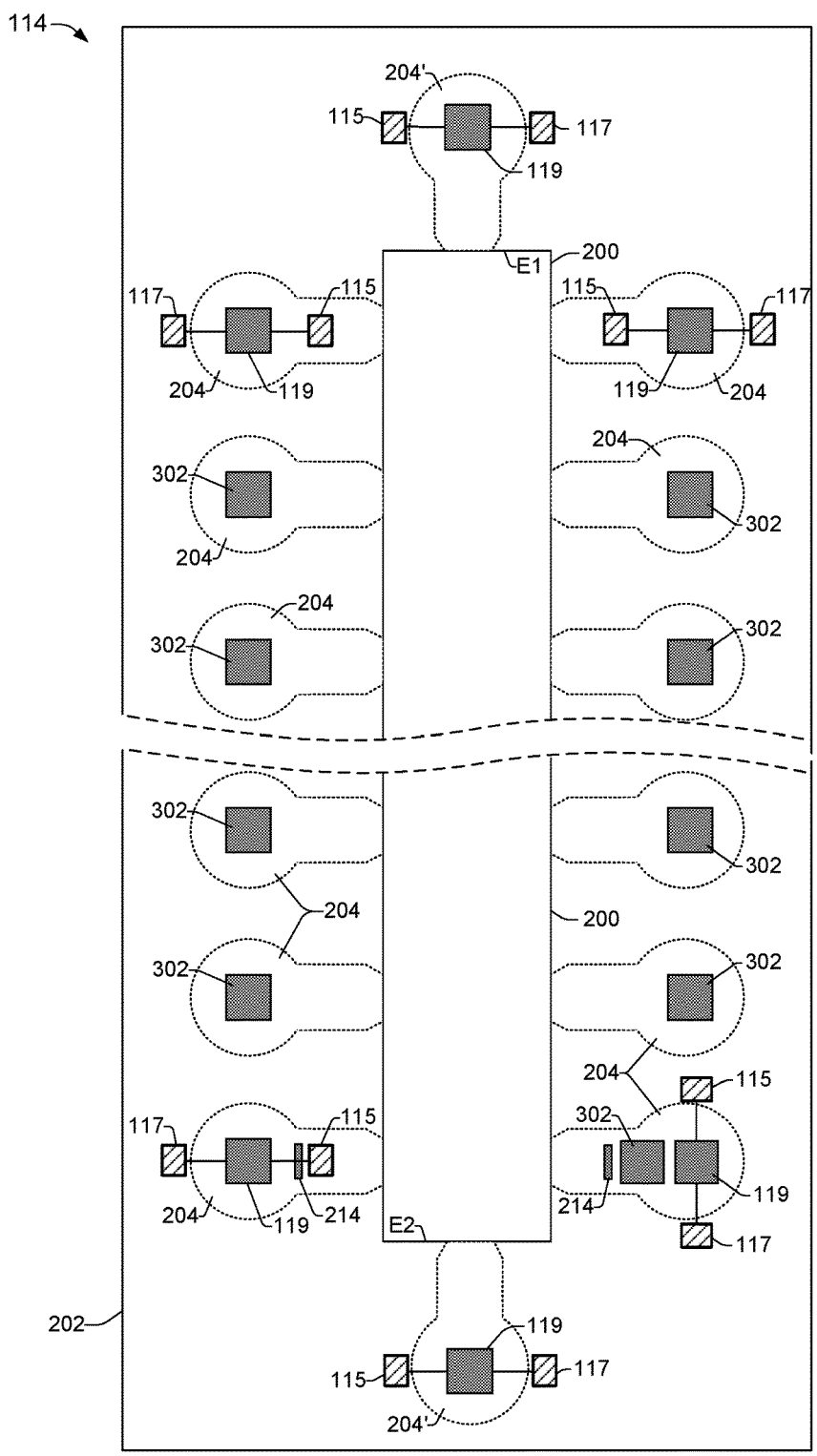
FIG. 2 shows a bottom view of an example printhead, including an on-chip fluid level sensor circuit and fluid property sensor circuit.

FIG. 2 shows a bottom view of an example printhead 114, including the on-chip fluid level sensor circuit 115 and fluid property sensor circuit 117. Because both circuits 115 and 117 incorporate shared capacitive sensor 119, they are both shown in FIG. 2 as being coupled to the sensor 119. As shown in FIG. 2, the orientation of the sensor circuits 115 and 117 with respect to the shared capacitive sensor 119, can vary. For example, sensor circuits 115 and 117 may be oriented horizontally or vertically with respect to the shared capacitive sensor 119, or they may be oriented in some other manner that facilitates an efficient use of the printhead silicon die space. The on-chip fluid level sensor circuit 115 implements a sample and hold technique to capture the state of the fluid (e.g., ink) level through the shared capacitive sensor 119. The capacitance of the capacitive sensor 119 changes with the level of ink in a fluid chamber 204 overlying the capacitive sensor 119. The operation of the fluid/ink level sensor 115 will be discussed further with reference to FIGS. 4-7. The on-chip fluid property sensor circuit 117 implements an ion-sensitive field-effect transistor (ISFET) whose sensing is based on changes in the ion concentration in the fluid and the gathering of a charge at a metal plate of the capacitive sensor 119 in contact with the fluid. The gathering of charge causes a shift in the transistor threshold voltage which can be measured by monitoring drain-to-source current at a particular drain-to-source voltage and used to determine properties of the fluid such as the fluid pH level. The operation of the fluid/ink property sensor 117 will be discussed further with reference to FIGS. 4-7.

Printhead 114 includes a die substrate 202, which may be formed of silicon. The silicon die substrate 202 may be doped. An example of the doped silicon die substrate 202 is a p-type silicon substrate. From the bottom view of the printhead 114, the die substrate 202 underlies a chamber layer 308 (FIG. 3) having the fluid chambers 204 formed therein and an orifice plate 310 having bore exits 121 formed therein. Both the chamber layer 308 and orifice plate 310 are described below with reference to FIGS. 3 and 4. However, the chamber layer 308 and orifice plate 310 are not shown in FIG. 2, in order to better illustrate the die substrate 202. Since the fluid chambers 204 are formed in the chamber layer 308 (not shown in FIG. 2), the fluid chambers 204 in FIG. 2 are shown in dashed lines in order to illustrate their positions with respect to a fluid slot 200 and the on-chip sensor circuits 115 and 117 and/or drop generators 302.

The fluid slot 200 is an elongated slot formed in the die substrate 202. The fluid slot 200 is in fluid communication with ink paths (not shown) that lead to the respective fluid chambers 204 that are positioned on both of the long sides of the fluid slot 200. By "fluid communication," it is meant that component(s) is/are configured so that a fluid can be in contact therewith. As an example, the fluid slot 200 may be connected to the ink paths so that fluid flows from the fluid slot 200 to the ink paths. As another example, a bore exit 121 that is in fluid communication with a chamber 204 may enable fluid contained within the chamber 204 to exit the bore 121. As still another example, a fluid chamber 204 in fluid communication with a drop generator 302 and/or a capacitive sensor 119 may contain fluid that is capable of contacting the drop generator 302 and/or the capacitive sensor 119.

While the example printhead 114 shown in FIG. 2 includes a single fluid slot 200, other examples are possible and contemplated in which the printhead 114 may include additional fluid slots 200, such as two or more fluid slots 200. The fluid slot 200 is in fluid communication with a fluid supply (not shown), such as the fluid reservoir 120 (shown in FIG. 1), which supplies ink to the fluid slot 200 and the fluid chambers 204.

Each fluid chamber 204 is in fluid communication with the drop generator 302 and/or the shared capacitive sensor 119. As shown in the FIG. 2 example, four shared capacitive sensors 119 along with their corresponding fluid level sensor circuits 115 and fluid property sensor circuits 117, may be positioned to be in fluid communication with the respective fluid chambers 204 located at the four corners of the ink slot 200. In this example, the other fluid chambers 204 may be in fluid communication with respective drop generators 302. Alternatively, in this example, any of the fluid chambers 204 may be in fluid communication with both the on-chip sensor circuits 115 and 117, and the drop generator 302 (see bottom right corner of the fluid slot 200 in FIG. 2). Due to the small size of the shared capacitive sensor 119, the capacitive sensor 119 and the drop generator 302 may be fabricated to be in fluid communication with the same fluid chamber 204. In another example, shown in phantom in FIG. 2, fluid chambers 204' may be formed at the two ends E1, E2 of the ink slot 200, and respective on-chip shared capacitive sensors 119 and corresponding sensor circuits 115 and 117 may be positioned to be in fluid communication with the respective fluid chambers 204'. In this example, the other fluid chambers 204 along the longer sides of the ink slot 200 may be in fluid communication with respective drop generators 302.

FIG. 3 shows a cross sectional view of an example of a nozzle 116 portion of the printhead 114, including the drop generator 302. The drop generator 302 is associated with a single fluid chamber 204 and bore exit 121. As shown in FIG. 3, the bore exit 121 is formed in the orifice plate 310 and the fluid chamber 204 is formed in the chamber layer 308. The bore exit 121 is in fluid communication with the fluid chamber 204, so that ink 312 in the fluid chamber 204 can be ejected out through the bore exit 121. In the printhead 114, the bore exits 121 may be arranged in the orifice plate 310 along the longer sides of the fluid slot 200 so they are positioned to be in fluid communication with respective fluid chambers 204 of respective nozzles 116.

The drop generator 302 includes an ejection element 303. In a thermal inkjet printhead, the ejection element 303 is a thermal firing resistor formed of a metal plate, which may be in contact with an insulating layer 304. Insulating layer 304 is in contact with a surface of the die substrate 202 and may be formed, for example, of un-doped silicate glass (USG), phosphosilicate glass (PSG), tetraethyl orthosilicate (TEOS), borophosphosilicate glass (BPSG), or combinations thereof. The metal plate of the thermal firing resistor may be formed, for example, of Al, Ti, an AlCu alloy, a TaAl alloy, or layers of metal(s) and alloy(s), such as a layer of Ti followed by a layer of AlCu, or a layer of TaAl followed by a layer of AlCu. In the example shown in FIG. 3, the ejection element 303 includes an electrically resistive layer 314 and a high conductive layer 316. As shown in FIG. 3, the high conductive layer 316 may include two bevels, between which the electrically resistive layer 314 is exposed. As an example, the electrically resistive layer 314 may have a thickness ranging from about 200 Angstroms to about 400 Angstroms, and the high conductive layer 316 may have a thickness of about 4800 Angstroms.

As shown in FIG. 3, a passivation layer 306 may be formed between the ejection element 303 and the fluid chamber 204 to protect the ejection element 303 from ink 312 in the chamber 204, and to act as a mechanical passivation or protective cavitation barrier structure to absorb the shock of collapsing vapor bubbles. Examples of materials making up the passivation layer 306 include SiC, Si3N4, or layers of these materials, such as a layer of Si3N4 followed by a layer of SiC.

The chamber layer 307 has walls 308 that define the fluid chambers 204, and that separate the die substrate 202 (and the various layers and elements formed thereon) from the orifice plate 310. An example of a material used to form the chamber layer 307 includes an epoxy-based negative photoresist (e.g., SU-8, IJ5000 from 3M, etc.).

During a thermal inkjet printing operation, a fluid drop is ejected from the chamber 204 through its corresponding bore exit 121. Ink 312 then refills the chamber 204 with fluid from the fluid slot 200. The fluid drop is ejected as a result of electric current being passed through the ejection element 303, which rapidly heats the element 303. As a result of this heating, a thin layer of the ink 312 adjacent to the passivation layer 306 in contact with the ejection element 303 is superheated and vaporizes. This creates a vapor bubble in the corresponding chamber 204. The rapidly expanding vapor bubble forces a fluid drop out of the corresponding bore exit 121. When the heated ejection element 303 cools, the vapor bubble quickly collapses, which draws more fluid from the fluid slot 200 into the chamber 204 in preparation for ejecting another drop from the nozzle 116.

Referring again to FIGS. 1 and 2, in addition to the drop generators 302, the printhead 114 also includes on-chip fluid level sensor circuits 115 and fluid property sensor circuits 117. As noted above, each fluid level sensor circuit 115 shares a capacitive sensor 119 with a fluid property sensor circuit 117. The fluid level sensor circuits 115 may or may not also include a clearing resistor 214. Since the ejection element 303 fires ink 312 directly, the clearing resistor 214 may be excluded. The components of both the fluid level sensor circuit 115 and fluid property sensor circuit 117 are integrated on the printhead 114. The sensor circuits 115 and 117 may additionally be electrically connected to off-chip components (i.e., components that are not integrated on the printhead 114), such as the current source 130 and the ADC 132 of the printer ASIC 126 (shown in FIG. 1). The off-chip components may be located on a printer carriage or the electronic controller 110 of the inkjet printing system 100.

As shown in FIG. 2, the components of the on-chip fluid level sensor circuits 115 and fluid property sensor circuits 117 may be located on the die substrate 202 along the ink slot 200 in any position where a drop generator 302 may be located. Various suitable positions for the on-chip sensor(s) 115 and 117 are described above, and include, for example, at the four corners of the ink slot 200.

Figure 4:
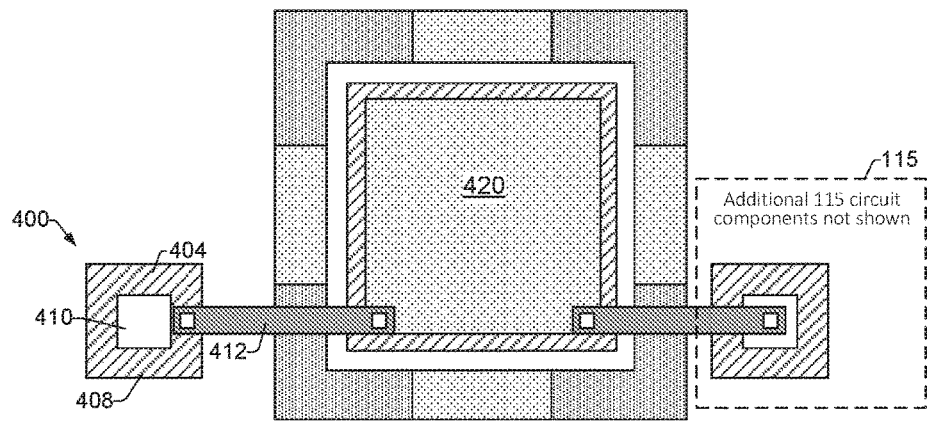
FIG. 4 shows a portion of an example printhead in cross section and top down views, including a fluid level sensor circuit, a fluid property sensor circuit, and a capacitive sensor that is part of both circuits.
Figure 4:
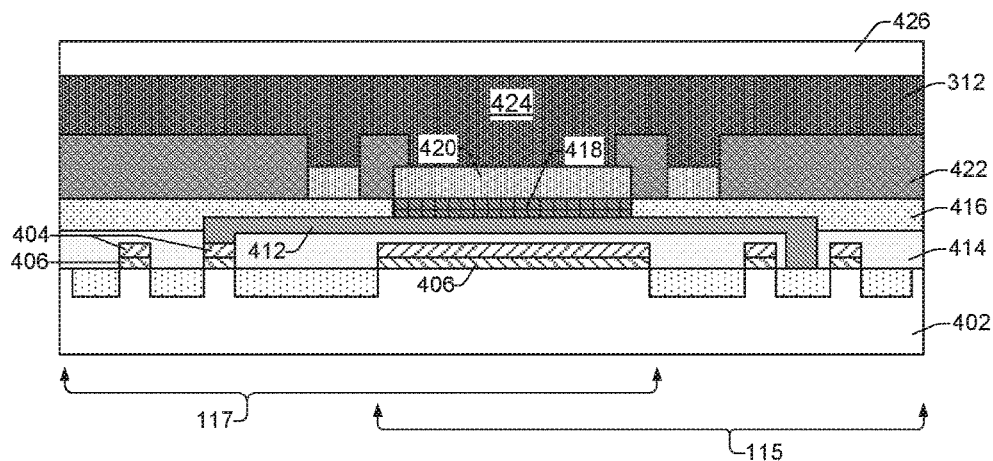
Figure 5:
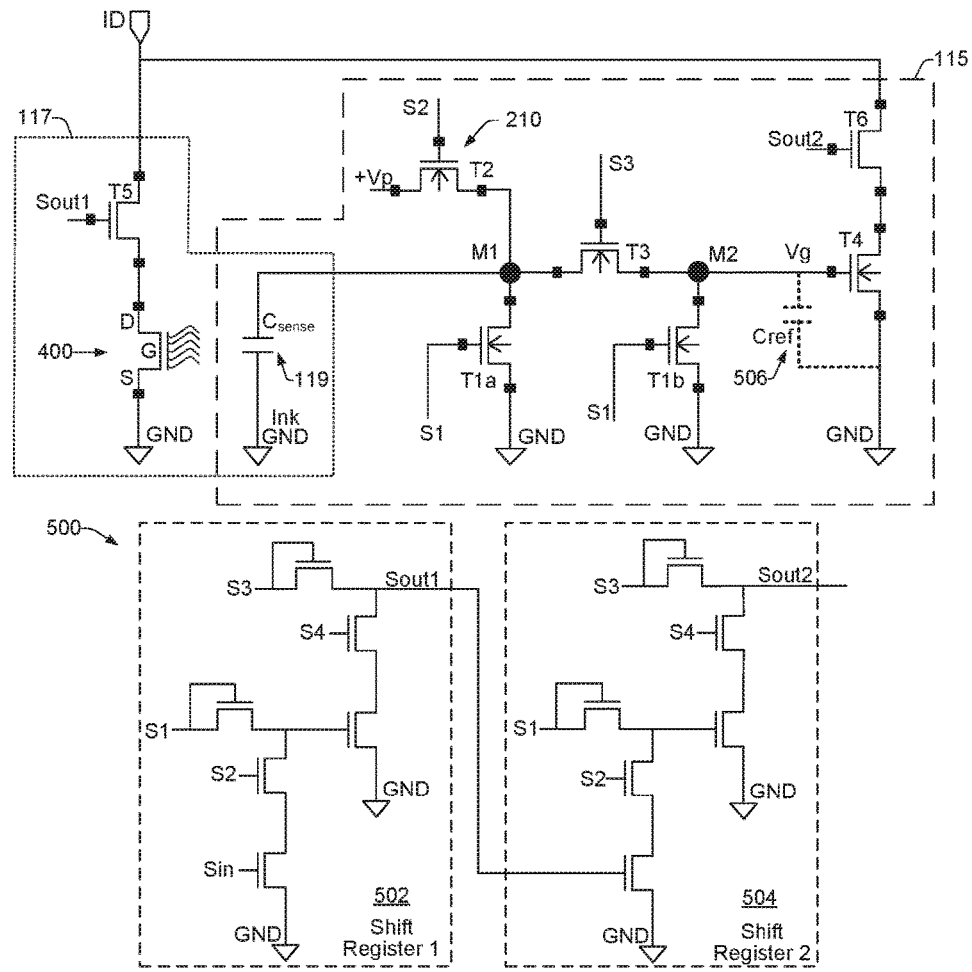
FIG. 5 shows an example circuit diagram depicting examples of a fluid level sensor circuit, a fluid property sensor circuit, and a capacitive sensor that is shared between the two circuits.

FIG. 4 shows a portion of an example printhead 114 in cross section and top down views, including a fluid level sensor circuit 115, a fluid property sensor circuit 117, and a capacitive sensor 119 that is part of both circuits 115 and 117, and is shared between them. FIG. 5 shows an example circuit diagram depicting examples of a fluid level sensor circuit 115, a fluid property sensor circuit 117, and a capacitive sensor 119 that is shared between the two circuits 115 and 117. FIG. 5 additionally shows an example of a shift register circuit 500, illustrated as a first shift register 502 and a second shift register 504. Shift registers 502 and 504 operate to switch between the two sensor circuits 115 and 117, in order to enable sharing of the capacitive sensor 119 to achieve multiple sensing functions including fluid level sensing from sensor circuit 115 and fluid property sensing from sensor circuit 117.

Referring primarily now to FIGS. 4 and 5, the fluid property sensor circuit 117 will be discussed. It is noted that the fluid property sensor circuit 117 shown in FIGS. 4 and 5 may include additional components, and that some of the components described herein may be removed and/or modified without departing from the scope of the fluid property sensor circuit 117. As shown in FIGS. 4 and 5, the fluid property sensor circuit 117 is depicted as including an ion-sensitive field effect transistor (ISFET) 400 formed in a substrate 402. The substrate 402 may correspond to a portion of the substrate 202 of the printhead 114 and may be formed of silicon. Alternatively, the substrate 402 may be a different substrate. The ISFET 400 is depicted as including a gate (G) 404 formed on a gate oxide layer 406. The gate 404 may be formed of a polysilicon material. The ISFET 400 is also depicted as including a source (S) 408 and a drain (D) 410, which are in contact with the gate oxide layer 406, and may form respective diffusion regions. In an example, field oxide is not used to isolate transistors. Rather, polysilicon is pattered and used as a mask to selectively diffuse regions in the substrate 402. Hence, a transistor may include a polysilicon ring separating one diffusion region from another.

Such a structure is one example, but other examples are possible and may include substrates having other field oxide separating diffusion regions. In one example, the fluid property sensor circuit 117 is implemented using N-type metal-oxide semiconductor (NMOS) logic such that the substrate 402 includes a P-type substrate and the diffusion regions corresponding to the source 408 and the drain 410 include N+ doped regions. NMOS logic may be used for implementing the fluid property sensor circuit 117. However, in other examples the fluid property sensor circuit 117 may be implemented using P-type metal-oxide semiconductor (PMOS) logic or complementary metal oxide semiconductor (CMOS) logic. In the case of PMOS logic, the substrate 402 may include N-type silicon and the diffusion regions corresponding to the source 408 and the drain 410 may include P+ doped regions. The configuration for N-wells in N-well CMOS logic are similar to the PMOS configuration, and the configuration for P-wells in P-well CMOS logic are similar to the NMOS configuration.

The gate oxide layer 406 may include a dielectric oxide material, such as silicon dioxide ($SiO_2$), a high-k dielectric material, such as hafnium oxide ($HfO_2$) or aluminum oxide ($Al_2O_3$), or the like. A polysilicon layer may be formed and patterned over the gate oxide layer 406 resulting in formation of a polysilicon gate 404 between the source 408 and the drain 410. A metal layer may be formed and patterned over the polysilicon gate 404 resulting in the formation of metal elements 412 in electrical contact with the polysilicon gate 404, source 408, and the drain 410.

A dielectric material 414 may be positioned to generally isolate the metal elements 412 and the polysilicon gate 404 from each other with the exception of the specific electrical contacts described above. The dielectric material 414 may be formed of, for example, silicon dioxide. A passivation layer 416 may be formed on the dielectric material 414, such that the passivation layer 416 is separated from the metal elements 412 by a section of the dielectric material 414. The passivation layer 416 may also be formed of a dielectric material, such as silicon nitride ($Si_3N_4$), silicon carbide (SiC), a combination thereof, or the like.

As also shown in FIG. 4, a switching layer 418 may be provided in electrical contact with a first metal element 412. The switching layer 418 is also depicted as being in electrical contact with a metal sensing plate 420, such that the switching layer 418 is sandwiched between the first metal element 412 and the metal sensing plate 420. The metal sensing plate 420 is further depicted as extending through a second passivation layer 422 and being exposed to the fluid 312 contained in the fluid chamber 424. Thus, the shared capacitive sensor 119 comprises a first metal element 412, the switching layer 418, the metal sensing plate 420, and the fluid 312 contained in the fluid chamber 424. The second passivation layer 422 can be formed, for example, of silicon nitride ($Si_3N_4$), silicon carbide (SiC), a combination thereof, or the like. According to a particular example, the metal sensing plate 420 is formed of TaAl.

The switching layer 418 may be formed of a switching oxide, such as a metallic oxide, may have a relatively small thickness, and may be formed of a high-K dielectric material (i.e., with a high dielectric constant). By way of example, the switching layer 418 may have a thickness in the range of between about 1 nm to about 50 nm and may have a dielectric constant (K) of at least about 6 to 80. Specific examples of suitable switching oxide materials may include silicon nitride, titanium dioxide, magnesium oxide, titanium oxide, zirconium oxide, hafnium oxide, vanadium oxide, niobium oxide, tantalum oxide, chromium oxide, molybdenum oxide, tungsten oxide, manganese oxide, iron oxide, cobalt oxide, copper oxide, zinc oxide, aluminum oxide, gallium oxide, silicon oxide, germanium oxide, tin dioxide, bismuth oxide, nickel oxide, yttrium oxide, gadolinium oxide, and rhenium oxide, among other oxides. In addition to the binary oxides presented above, the switching oxides may be ternary and complex oxides such as silicon oxynitride. The oxides presented may be formed using any of a number of different processes such as sputtering from an oxide target, reactive sputtering from a metal target, atomic layer deposition (ALD), oxidizing a deposited metal or alloy layer, etc. According to an example, the switching layer 418 may be formed directly on the surface of the first metal element 412 and/or the surface of the metal sensing plate 420.

The resistance level of the switching layer 418 may be changed in response to various programming conditions, and the switching layer 418 is able to exhibit a memory of past electrical conditions. For example, the switching layer 418 may be programmed to have a first resistance state or a second resistance state and may retain the programmed resistance state following removal of a programming condition. More specifically, the resistance level of the switching layer 418 may be changed through application of a voltage or current (e.g., through an electrode 426, discussed below), in which the voltage or current may cause mobile dopants in the switching layer 418 to move, which may alter the electrical operation of the switching layer 418. Thus, the resistance levels of the switching layer 418 may correspond to different electrical fields applied to the switching layer 418 through application of different voltages or currents. By way of example, the switching layer 418 may be programmed to have a lower resistance level through application of a higher voltage or current.

After removal of the voltage or current, the locations and characteristics of the dopants in the switching layer 418 are to remain stable until the application of another programming or writing electrical field. That is, the switching layer 418 remains at the programmed resistance level following removal of the voltage or current. In addition, the resistance level of the switching layer 418 may be changed after the resistance level has been set or programmed, i.e., the resistance state is reversible. For instance, following the setting of the switching layer 418 to have a first resistance state, another voltage or current, for instance, having a reverse polarity, may be applied to the switching layer 418, which may cause the mobile dopants to move in an opposite direction, thereby causing the switching layer 418 to have a second resistance state. In this example, the second resistance state may correspond to a higher resistance level as compared with the first resistance state. When in the first resistance state, a voltage or current may flow between the metal sensing plate 420 and the first metal element 412 through the switching layer 418. When in the second resistance state, the switching layer 418 may prevent the flow of a voltage or reading current between the metal sensing plate 420 and the first metal element 412. In this regard, when in the first resistance state, the switching layer 418 may prevent a capacitor from being formed by the first metal element 412 and the metal plate 420. In other words, the switching layer 418, when in the first resistance state, may prevent the ISFET 400 from being operational and may thus prevent the ISFET 400 from performing a sensing operation. In contrast, when in the second resistance state, the switching layer 418 may enable the formation of a relatively high capacitance capacitor between the first metal element 412 and the metal plate 420. In other words, the switching layer 418, when in the second resistance state, may enable the ISFET 400 to be operational.

The electronic controller 110 (FIG. 1) may control operations of the fluid property sensor circuit 117. In one example, the controller 110 may control whether the fluid property sensor circuit 117 is to detect the property of the fluid 312 by changing the resistance state of the switching layer 418. That is, the controller 110 may set the switching layer 418 to be in the first resistance state, i.e., have a first resistance level, in which the switching layer 418 is to short a capacitor in the fluid property sensor circuit 117 and thus render the fluid property sensor circuit 117 non-operational.

In the first resistance state, the switching layer 418 may thus prevent the fluid property sensor circuit 117 from detecting the property of the fluid 312. In this example, the controller 110 may cause a first electrical field having a sufficiently high strength to be created across the switching layer 418, which may cause the switching layer 418 to switch from the first resistance state to the second resistance state, in which the resistance level of the switching layer 418 is higher than the resistance level under the first resistance state. As the resistance level of the switching layer 418 is increased, the capacitance between the metal plate 420 and the first metal element 412 may be increased, thereby enabling the fluid property sensor circuit 117 to detect the property of the fluid 312.

As shown in FIG. 4, an electrode 426 may be positioned in an aligned and spaced relation to the metal plate 420 such that fluid 312 in the fluid chamber 424 may be present between the metal plate 420 and the electrode 426. The electrode 426 may be formed on the orifice plate 310 (FIG. 3) over the ISFET 400. In addition, the electrode 426 may be capacitively coupled to the ISFET 400 through fluid 312 in the fluid chamber 424, the metal plate 420, the switching layer 418, and the first metal element 412. In some examples, the fluid property sensor circuit 117 may be disposed in a fluid chamber 424 that does not contain a fluid ejector 302 (FIG. 3).

In an example, the orifice plate 310 is formed of metal and the electrode 426 is formed as a protrusion of the orifice plate 310. In such case, the orifice plate 310 and the electrode 426 may include nickel (Ni) with a palladium (Pa) or Titanium (Ti) coating, for example. In another example, the orifice plate 310 may be formed of a polymer material and the electrode 426 may be embedded in the polymer material. In such case, the electrode 426 may be formed of TaAl, for example.

The polysilicon gate 404 together with the respective portions of the first metal layer 412, the switching layer 418, and the metal sensing plate 420 in electrical contact with the polysilicon gate 404 may form a "floating-gate" of metal-oxide field effect transistor (MOSFET) having the source 408 and the drain 410 (assuming N-MOS). Together with the dielectric layers 414, 416, the MOSFET comprises the ISFET 400. The metal element(s) 412 and the metal sensing plate 420 may be formed of any suitable metal or metal alloy, for instance, Aluminum (Al), Aluminum copper (AlCu), Tantalum aluminum (TaAl), etc. The electrode 426 may also be formed of any of these types of metal or metal alloy materials.

Referring still to FIGS. 4 and 5, in operation, the source (S) 408 may be coupled to a reference voltage (e.g., electrical ground, GND), and the drain (D) 410 may be coupled to current source ID (i.e., current source 130 in printer ASIC 126) through enabling transistor T5, discussed below. A voltage may be applied to the electrode 426, causing the electrode 426 to essentially act as the reference gate of the ISFET 400. The voltage between the electrode 426 and the source 408 is the gate-to-source voltage, referred to as Vgs. The charge distribution for the ISFET 400 will change according to the ion concentration in the fluid 312. As the charge distribution changes, the threshold voltage of the ISFET 400 changes. For example, if the fluid property sensor circuit 117 is to measure pH, then the ISFET's threshold voltage depends on the pH of the fluid 312 in contact with the metal sensing plate 420. A change in the threshold voltage of the ISFET 400 may be measured by measuring the change in ID, or drain-to-source current (Ids) for a particular drain-to-source voltage (Vds). In general, materials for the electrode 426 and the metal plate 420 may be selected such that the threshold voltage of the ISFET 400 changes over time in response to changes in a particular ion combination (pH described herein by way of example). Changes in the threshold voltage may be detected through measurements of ID, the drain-to-source current, given a particular drain-to-source voltage.

The operations described above may be performed when the resistance state of the switching layer 418 is set to cause a capacitor to be operational in the fluid property sensor circuit 117. However, if the resistance state of the switching layer 418 is set to allow the flow of a current or a voltage from the metal sensing plate 420 to the first metal element 412, a change in drain-to-source current (Ids) may not be measured and thus the fluid property sensor circuit 117 may be in the "off" condition.

The electronic controller 110 may control the resistance state of the switching layer 418 through application of a changing voltage or a changing current, or a changing voltage or a changing current having a reverse polarity, through the switching layer 418 as applied between the electrode 426 and the source 408. In this example, the switching layer 418 may be formed such that the voltage or current level required to change the resistance state of the switching layer 418 (e.g., a changing voltage or a changing current) is higher than the voltage or current level used by the fluid property sensor circuit 117 to detect a property of the fluid 312 (e.g., a reading voltage or a reading current). That is, the voltage applied to the electrode 426 during a sensing operation of the fluid 312 may not generate a sufficiently strong electrical field through the switching layer 418 to cause the resistance state of the switching layer 418 to be changed.

As noted above, in addition to the fluid property sensor circuit 117, FIGS. 4 and 5 also include a fluid level sensor circuit 115 which will now be discussed. The fluid level sensor circuit 115 may include additional components, and some of the components described herein may be removed and/or modified without departing from the scope of the fluid level sensor circuit 115. As an example, the dashed box shown in FIG. 4 is intended to indicate additional components of the sensor circuit 115 that are not specifically illustrated in FIG. 4. In addition, because the description above regarding the capacitive sensor 119 and its components applies similarly to the fluid level sensor circuit 115, the discussion of the components of the capacitive sensor 119 (i.e., the first metal element 412, the switching layer 418, the metal sensing plate 420, and the fluid 312 contained in the fluid chamber 424) will not be repeated, other than to indicate their functioning within the fluid level sensor circuit 115. For example, operations described above with respect to the resistance state of switching layer 418 that can cause the fluid property sensor circuit 117 to be operational or not operational, may apply in a similar manner to cause the fluid level sensor circuit 115 to be operational or not operational. Accordingly, discussion of the fluid level sensor circuit 115 can be made with primary reference to the circuit diagram of FIG. 5 and timing diagram of FIG. 6.

Figure 6:
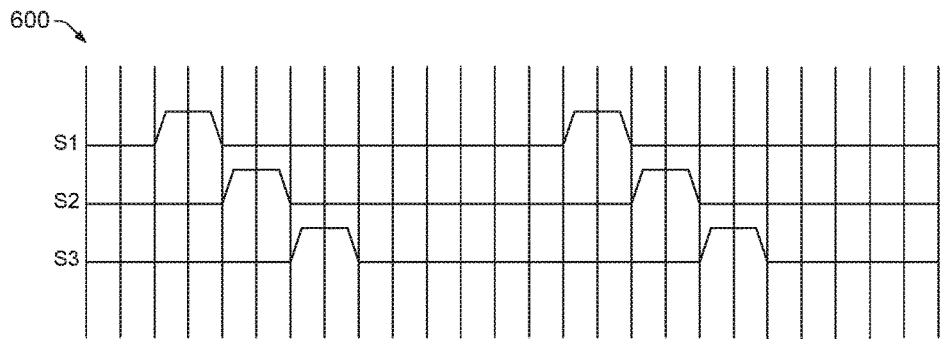
FIG. 6 shows an example of a partial timing diagram having non-overlapping clock signals with synchronized data and fire signals that may be used to drive an example printhead.

FIG. 6 shows an example of a partial timing diagram 600 having non-overlapping clock signals (S1-S3) with synchronized data and fire signals that may be used to drive an example printhead 114. The clock signals in timing diagram 600 can also be used to drive the operation of the fluid/ink level sensor circuit 115 as shown in FIG. 5. Thus, referring now primarily to FIGS. 5 and 6, it is shown that the fluid level sensor circuit 115 employs a charge sharing mechanism to determine different levels of ink in a chamber 424 (FIG. 4). The sensor circuit 115 includes two first transistors, Ti (T1*a*, T1*b*), configured as switches. During operation of the sensor circuit 115, in a first step a clock pulse S1 is used to close the transistor switches T1*a* and T1*b*, coupling memory nodes M1 and M2 to ground and discharging the capacitive sensor 119 and the reference capacitor 506. Reference capacitor 506 is the capacitance between node M2 and ground. In this example, reference capacitor 506 is implemented as the inherent gate capacitance of evaluation transistor T4, and it is therefore illustrated using dashed lines. Reference capacitor 506 additionally includes associated parasitic capacitance such as gate-source overlap capacitance, but the T4 gate capacitance is the dominant capacitance in reference capacitor 506. Using the gate capacitance of transistor T4 as a reference capacitor 506 reduces the number of components in sensor circuit 115 by avoiding a specific reference capacitor fabricated between node M2 and ground. However, in other examples, adjustments to the value of reference capacitor 506 can be made through the inclusion of a specific capacitor fabricated from M2 to ground (i.e., in addition to the inherent gate capacitance of T4).

In a second step, the S1 clock pulse terminates, opening the T1*a* and T1*b* switches. Directly after the T1 switches open, an S2 clock pulse is used to close transistor switch T2. Closing T2 couples node M1 to a pre-charge voltage, Vp (e.g., on the order of +15 volts), and a charge Q1 is placed across capacitive sensor 119 (illustrated as Csense in FIG. 5) according to the equation, Q1=(Csense)(Vp). At this time the M2 node remains at zero voltage potential since the S3 clock pulse is off. In a third step, the S2 clock pulse terminates, opening the T2 transistor switch. Directly after the T2 switch opens, the S3 clock pulse closes transistor switch T3, coupling nodes M1 and M2 to one another and sharing the charge Q1 between capacitive sensor 119 and reference capacitor 506. The shared charge Q1 between capacitive sensor 119 and reference capacitor 506 results in a reference voltage, Vg, at node M2 which is also at the gate of evaluation transistor T4, according to the following equation:

$$Vg = \left( \frac{C_{sense}}{C_{sense} + C_{ref}} \right) \cdot Vp$$

Vg remains at M2 until another cycle begins with a clock pulse S1 grounding memory nodes M1 and M2. Vg at M2 turns on evaluation transistor T4, which enables a measurement at ID (the drain of transistor T4). In this example it is presumed that transistor T4 is biased in the linear mode of operation, where T4 acts as a resistor whose value is proportional to the gate voltage Vg (i.e., reference voltage). The T4 resistance from drain to source (coupled to ground) is determined by forcing a small current at ID (i.e., a current on the order of 1 milliamp). ID is coupled to a current source, such as current source 130 in printer ASIC 126. Upon applying the current source at ID, the voltage is measured at ID (VID). Firmware, such as Rsense module 128 executing on controller 110 or ASIC 126 can convert VID to a resistance Rds from drain to source of the T4 transistor using the current and VID. The ADC 132 in printer ASIC 126 subsequently determines a corresponding digital value for the resistance Rds. The resistance Rds enables an inference as to the value of Vg based on the characteristics of the evaluation transistor T4. Based on a value for Vg, a capacitance value for capacitive sensor 119 (i.e., Csense) can be found from the equation for Vg shown above. A level of ink can then be determined based on the value of capacitive sensor 119.

Once the resistance Rds is determined, there are various ways in which the fluid ink level can be found. For example, the measured Rds value can be compared to a reference value for Rds, or a table of Rds values experimentally determined to be associated with specific ink levels. With no ink (i.e., a "dry" signal), or a very low ink level, the value of the capacitive sensor 119 is very low. This results in a very low Vg (on the order of 1.7 volts), and the evaluation transistor T4 is off or nearly off (i.e., T4 is in cut off or sub-threshold operation region). Therefore, the resistance Rds from ID to ground through T4 would be very high (e.g., with ID current of 1.2 mA, Rds is typically above 12 k ohm). Conversely, with a high ink level (i.e., a "wet" signal), the value of the capacitive sensor 119 is close to 100% of its value, resulting in a high value for Vg (on the order of 3.5 volts). Therefore, the resistance Rds is low. For example, with a high ink level Rds is below 1 k ohm, and is typically a few hundred ohms.

Figure 7:
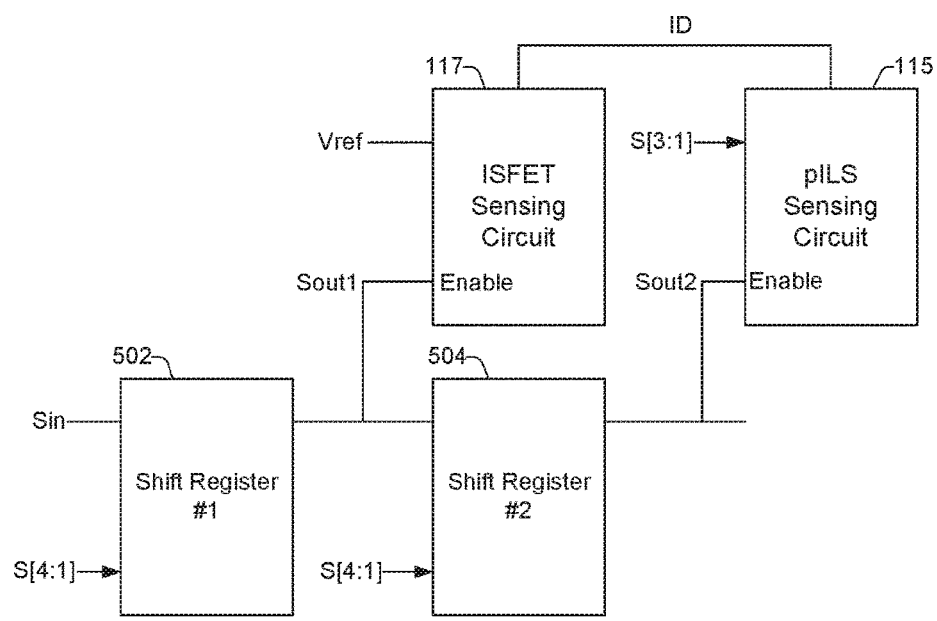
FIG. 7 shows a simplified block diagram of an example fluid level sensor circuit, an example fluid property sensor circuit, and example shift registers that function to alternately enable and disable the sensing circuits.

As noted above, in addition to showing examples of a fluid level sensor circuit 115, a fluid property sensor circuit 117, and a capacitive sensor 119 shared between the two circuits 115 and 117, FIG. 5 additionally shows an example of a shift register circuit 500. The shift register circuit 500 includes shift registers 502 and 504 that enable switching between the two sensor circuits 115 and 117. This enables sharing of the capacitive sensor 119 to achieve multiple sensing functions, including the fluid level sensing from sensor circuit 115 and the fluid property sensing from sensor circuit 117. FIG. 7 shows a more simplified block diagram of the sensing circuits 115 and 117, and the shift registers 502 and 504 that function to alternately enable and disable the sensing circuits 115 and 117. The Sout1 and Sout2 outputs of the shift registers are coupled as indicated in FIGS. 5 and 7 to corresponding enable inputs at transistors T5 and T6, respectively, of the sensing circuits 115 and 117. This allows the shift registers 502 and 504 to control which sensing circuit 115 or 117 is enabled and which is disabled through alternately coupling and decoupling circuits 115 and 117 to a current source ID (i.e., current source 130 in printer ASIC 126). Thus, one sensing function at a time can be enabled for operation (i.e., fluid level sensing, or fluid property sensing).

Figure 8:
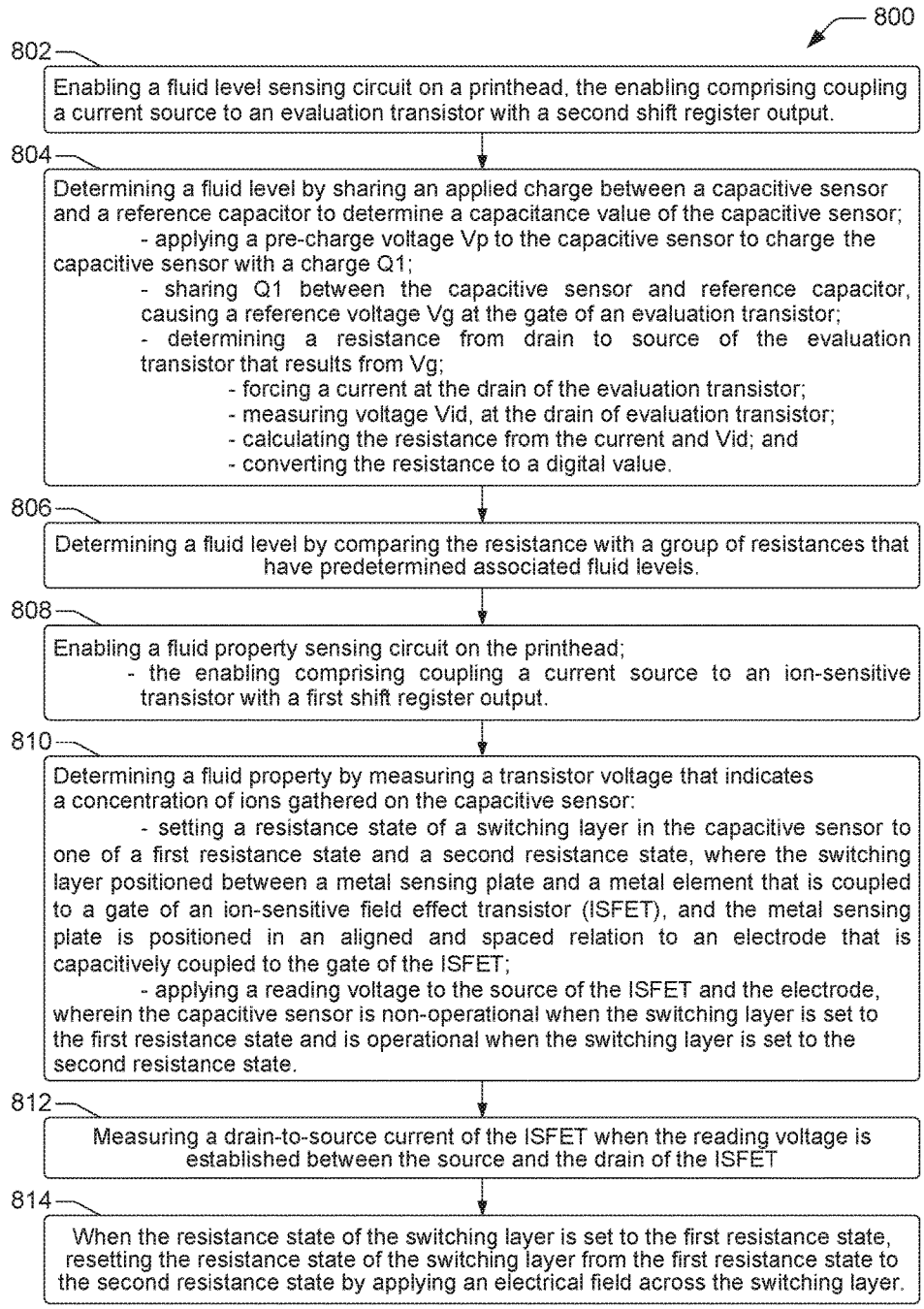
FIG. 8 shows a flow diagram that illustrates an example method of operating a fluid sensing device.

FIG. 8 shows a flow diagram that illustrates an example method 800 of operating a fluid sensing device. Method 800 is associated with examples discussed above with regard to FIGS. 1-7, and details of the operations shown in method 800 can be found in the related discussion of such examples. The operations of method 800 may be embodied as programming instructions stored on a non-transitory, machine-readable (e.g., computer/processor-readable) medium, such as memory 111 shown in FIG. 1. In some examples, implementing the operations of method 800 can be achieved by a processor, such as a processor 107 of FIG. 1, reading and executing the programming instructions stored in a memory 111. In some examples, implementing the operations of method 800 can be achieved using an ASIC 126 and/or other hardware components alone or in combination with programming instructions executable by processor 107.

Method 800 may include more than one implementation, and different implementations of method 800 may not employ every operation presented in the flow diagram of FIG. 8. Therefore, while the operations of method 800 are presented in a particular order within the flow diagram, the order of their presentation is not intended to be a limitation as to the order in which the operations may actually be implemented, or as to whether all of the operations may be implemented. For example, one implementation of method 800 might be achieved through the performance of a number of initial operations, without performing one or more subsequent operations, while another implementation of method 800 might be achieved through the performance of all of the operations.

Referring now to the flow diagram of FIG. 8, an example method 800 of operating a fluid sensing device begins at block 802, with enabling a fluid level sensing circuit on a printhead. Enabling the fluid level sensing circuit comprises coupling a current source to an evaluation transistor with a second of two shift register outputs. The method 800 continues with determining a fluid level by sharing an applied charge between a capacitive sensor and a reference capacitor. Sharing the charge between the capacitive sensor and the reference capacitor enables a determination of the capacitance value of the capacitive sensor. The capacitance value can be determined by applying a pre-charge voltage Vp to the capacitive sensor to charge the capacitive sensor with a charge Q1, sharing Q1 between the capacitive sensor and reference capacitor, which causes a reference voltage Vg at the gate of an evaluation transistor, and then determining a resistance from drain to source of the evaluation transistor that results from Vg. A current can then be forced at the drain of the evaluation transistor and the voltage Vid can be measured. This enables a calculation of the resistance using the current and Vid, and the resistance can be converted to a digital value for comparison. As shown at block 806, method 800 can continue with determining a fluid level. This can be done by comparing the resistance with a group of resistances that have predetermined associated fluid levels.

The method 800 continues at block 808 with enabling a fluid property sensing circuit on the printhead. Enabling the fluid property sensing circuit comprises coupling the current source to an ion-sensitive transistor with a first shift register output. As shown at block 810, the method 800 can continue with determining a fluid property by measuring a transistor voltage that indicates a concentration of ions gathered on the capacitive sensor. This determination can include setting a resistance state of a switching layer in the capacitive sensor to one of a first resistance state and a second resistance state. The switching layer is positioned between a metal sensing plate and a metal element that is coupled to a gate of an ion-sensitive field effect transistor (ISFET), and the metal sensing plate is positioned in an aligned and spaced relation to an electrode that is capacitively coupled to the gate of the ISFET. Determination of a fluid property can continue with applying a reading voltage to the source of the ISFET and the electrode, where the capacitive sensor is non-operational when the switching layer is set to the first resistance state and is operational when the switching layer is set to the second resistance state.

At block 812 of the method 800, a drain-to-source current of the ISFET is measured once the reading voltage is established between the source and the drain of the ISFET. At block 814, when the resistance state of the switching layer has been set to the first resistance state, the method 800 includes resetting the resistance state of the switching layer from the first resistance state to the second resistance state by applying an electrical field across the switching layer.

What is claimed is:

1. A device for sensing a property and level of a fluid, comprising:
   a capacitive sensor including:
      a metal element;
      a switching layer positioned on the metal element;
      a metal sensing plate positioned on the switching layer to contact a substance;
   a first circuit to determine a capacitive value of the capacitive sensor by putting a charge on the capacitive sensor, the capacitive value to indicate a fluid level of the substance; and
   a second circuit comprising an ion-sensitive transistor to sense a change in ion concentration of the substance and a charge at the metal sensing plate, the charge to shift a gate-to-source voltage (Vgs) of the ion-sensitive transistor, the second circuit to determine the Vgs, the Vgs to indicate a concentration of ions in the substance.

2. The device as in claim 1, further comprising:
   a shifting circuit to alternately enable one of the first circuit and the second circuit.

3. The device as in claim 1, wherein the substance is selected from the group consisting of ink, ink and air, and air.

4. The device as in claim 1, wherein the first circuit comprises:
   an evaluation transistor having a gate capacitance with which to share the charge on the capacitive sensor; and
   a gate voltage at the evaluation transistor resulting from the shared charge, the gate voltage to turn on the evaluation transistor and enable a determination of the capacitive value of the capacitive sensor.

5. The device as in claim 1, wherein:
   the ion-sensitive transistor comprises an ion-sensitive field effect transistor (ISFET) having a gate, a source, and a drain;
   the switching layer is positioned between the metal sensing plate and the metal element;
   the metal element is coupled to the gate;
   the metal sensing plate is positioned in an aligned and spaced relation to an electrode that is capacitively coupled to the gate, the electrode comprising the gate of the ISFET when a voltage is applied to the electrode; and,
   the Vgs comprises voltage between the electrode and the source.

* * * * *